United States Patent [19]
Edwards

[11] Patent Number: 5,748,393
[45] Date of Patent: May 5, 1998

[54] MOUNTING ARRANGEMENT

[75] Inventor: Hywel Edwards, Wales, United Kingdom

[73] Assignee: Pilkington P.E. Limited, Wales, United Kingdom

[21] Appl. No.: 821,666

[22] Filed: Mar. 19, 1997

[30] Foreign Application Priority Data

Mar. 20, 1996 [GB] United Kingdom .................. 9605861

[51] Int. Cl.[6] ................................................ G02B 7/02
[52] U.S. Cl. ...................... 359/822; 359/823; 359/432; 359/696
[58] Field of Search ........................ 359/696, 822, 823, 824, 432, 399, 694; 360/96.5, 104, 105, 106

[56] References Cited

U.S. PATENT DOCUMENTS

| | | | |
|---|---|---|---|
| 5,225,941 | 7/1993 | Saito et al. | 359/824 |
| 5,377,048 | 12/1994 | Tada et al. | 359/823 |
| 5,406,417 | 4/1995 | Denvenyi | 359/823 |
| 5,552,939 | 9/1996 | Tseng et al. | 359/822 |
| 5,636,062 | 6/1997 | Okuyama et al. | 359/823 |
| 5,644,440 | 7/1997 | Akada | 359/823 |

FOREIGN PATENT DOCUMENTS

| | | |
|---|---|---|
| 1073088 | 6/1967 | United Kingdom . |
| 2 062 156 | 5/1981 | United Kingdom . |

Primary Examiner—Loha Ben
Attorney, Agent, or Firm—Bell Seltzer Park

[57] ABSTRACT

A lens mounting arrangement (10) for, for example, an optical telescope, permits movement of the lens from an initial position to an accurately defined first position. The arrangement comprises a track (16) including a first stop (18) at a first end of the track, a lens carriage (12) moveable along the track, and a rotating drive (20) coupled to the lens carriage for moving the lens along the track and into contact with the stop, the stop defining the first position. A coupling (22, 26) is provided between the drive and the lens carriage and includes a resilient link (26) such that the lens carriage may be brought into positive contact with the stop, deformation of the resilient link accommodating excess movement of the drive.

12 Claims, 1 Drawing Sheet

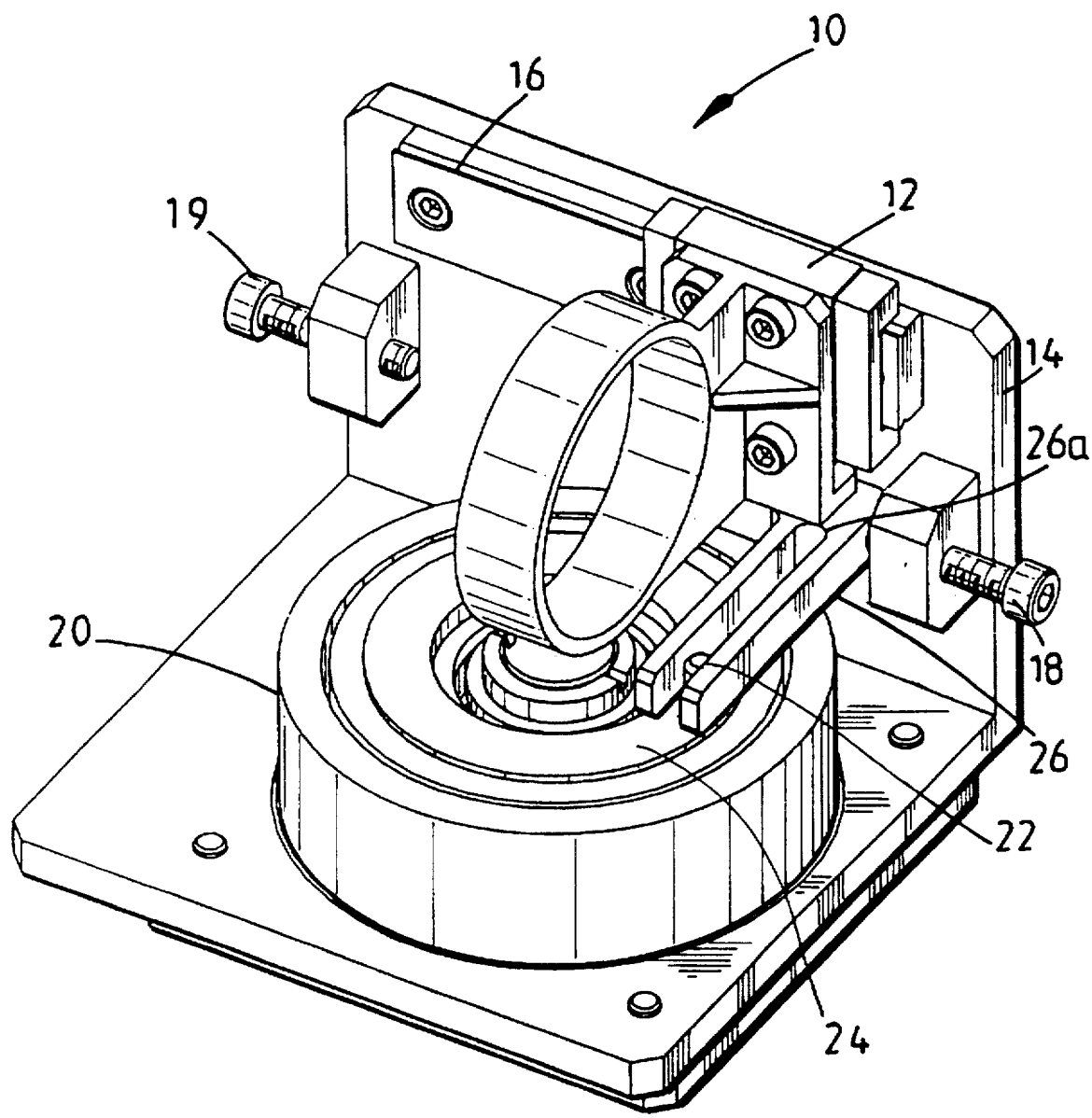

MOUNTING ARRANGEMENT

FIELD OF THE INVENTION

This invention relates to a mounting arrangement, and in particular, but not exclusively, to a lens mounting arrangement.

An object of one embodiment of the invention is to provide an arrangement suitable for moving a magnification change carriage within an optical telescope from one magnification to the other.

SUMMARY OF THE INVENTION

According to the present invention there is provided an arrangement for mounting an item and permitting movement of the item to an accurately defined first position, the arrangement comprising:

a track including a first stop at a first end of the track;

a member for mounting an item, the member being moveable along the track;

drive means coupled to the mounting member for moving the member along the track and into contact with the stop, the stop defining said first position; and a coupling provided between the drive means and the mounting member including a resilient link.

In use, the arrangement allows accurate location of the mounting member at the first end of the track simply by accurate location of the stop. The provision of the resilient link in the coupling between the drive means and the mounting member obviates the requirement to accurately control the drive means, and merely requires that the drive means moves the mounting member into contact with the stop; if the drive means is arranged such that it would, if unrestrained, tend to move the mounting member beyond the first stop, the resilient link accommodates this tendency while ensuring that the mounting member is held firmly against the stop. In the past, mechanisms of this nature have required elaborate mechanical and electrical solutions to prevent damage at the stops. These conventional solutions carry a time penalty.

Preferably, the track includes a second stop at a second end of the track to define a second position, and the drive means is arranged to move the mounting member between the stops, such that the resilient link is deformed at both ends of travel. Most preferably, the resilient link comprises two spring members, one being in tension at one end of travel and the other being in tension at the other end of travel. In this manner backlash and hysteresis of the mounting member at the two end positions are minimised whilst accuracy is optimised. This arrangement may, for example, be utilised to provide a mounting for a magnification change carriage within an optical telescope, for moving a lens from one magnification to the other, as defined by the first and second stops.

Preferably also, the drive means is a rotating drive and includes a coupling portion spaced from the axis of rotation of the drive for engaging a coupling portion provided on the mounting member, whereby rotation of the drive means produces linear movement of the mounting member along the track. Typically, the drive means will rotate the coupling portion approximately 180 degrees to move the mounting member from one end of the track to the other. Conveniently, the drive means is in the form of a limited angle torque motor. Most preferably, the drive means coupling portion is in the form of a pin and the mounting member coupling portion is in the form of a sprung fork.

A rotating drive means provides a continuously variable gear ratio providing high linear force near each end stop, to ensure sufficient loading of the resilient link, and high linear speed at the centre of travel. This allows the size and power of the drive means to be optimised. A further advantage is that acceleration and deceleration of the moving mounting member are achieved automatically due to the drive geometry, and end to end travel time minimised, without requiring provision of complex mechanical or electronic controls. The acceleration and deceleration characteristics of the drive geometry also minimise stress on the mounting member allowing optimisation of the design and weight savings, and extend the life of the end stops.

BRIEF DESCRIPTION OF THE DRAWING

This and other aspects of the present invention will now be described, by way of example, with reference to the accompanying drawing, which is a perspective view of a lens mounting arranging 10 in accordance with preferred embodiment of the present invention.

DETAILED DESCRIPTION OF THE DRAWINGS

The illustrated arrangement 10 is used to move a lens carriage 12 within an optical telescope from one magnification to another.

The arrangement 10 comprises a body in the form of an angled plate 14 which carries a linear track 16 on which the carriage 12 is mounted. The ends of travel of the carriage 12 are defined by adjustable end stops 18, 19 mounted on the plate 14. Drive for the carriage 12 is provided by a limited angle torque motor 20 mounted on the base of the plate 14. A peg 22 on the upper surface of the motor rotor 24 engages with a sprung fork 26 extending from the carriage 12.

By energising the motor 20 such that the rotor 24 moves through 180°, the carriage 12 is moved along the track 16 between the end stops 18, 19, which are adjusted to provide precise control of the lens carriage 12 at each end stop position.

The torque motor 20 is arranged such that, if unrestrained, the carriage 12 would be moved beyond the end stops 18, 19. This ensures that one finger of the fork 26 is in tension at one end of travel and the other finger is in tension at the other end of travel. Accordingly, the torque motor throw does not have to be accurate, and the fork 26 provides backlash free restraint for the carriage 12. Further, during actuation of the motor 20 the fork 26 transmits full power while the peg 22 is positioned at the root of the fork 26a while providing damping at the end of travel.

The arrangement 10 provides a continuously variable gear ratio: as the carriage 12 approaches an end stop the gear ratio increases towards infinity as the motor 20 travels over centre, and when passing through the centre of travel the gear ratio is 1:1. Accordingly, high linear force is developed near each end stop, ensuring sufficient loading of the sprung fork 26, and high linear speed is developed at the centre of travel. This allows motor size to be optimised and the carriage will maintain its precise position under external loads even if the power supply to the motor 20 is removed. Acceleration and deceleration of the moving carriage are automatically achieved due to the drive geometry, without the use of servo electronics or other complex controls. This acceleration/deceleration characteristic also minimises stress on the carriage 12, allowing optimisation of the design, and saving weight. Also, the acceleration and deceleration characteristics allow the end to end travel time to minimised without the use of complex electronics.

It will be clear to those of skill in the art that the above described arrangement 10 provides for accurate control of movement of the lens carriage 12 between the two end stops 18, 19 with minimal use of high accuracy components and complex controls.

It will also be clear to those of skill in the art that the above described embodiment is merely exemplary of the present invention, and that various modifications and improvements may be made thereto without departing from the scope of the invention. In particular, although the illustrated embodiment relates to a lens mounting arrangement, the invention may be utilised in many other applications in which it is desired to move an item to a first accurately defined position, and in particular in applications in which it is desired to move an item between first and second accurately defined positions.

I claim:

1. An arrangement for mounting an item and permitting movement of the item to an accurately defined first position, the arrangement comprising:

a track including a first stop at a first end of the track;

a member for mounting an item, the member being moveable along the track;

drive means coupled to the mounting member for moving the member along the track and into contact with the stop, the stop defining said first position; and a coupling provided between the drive means and the mounting member including a resilient link.

2. The arrangement of claim 1, wherein the drive means is operable to move the mounting member along the track into contact with the first stop and to deform the resilient link such that the mounting member is positively located against the stop.

3. The arrangement of claim 1, wherein the track includes a second stop at a second end of the track to define a second position, and the drive means is operable to move the mounting member between the stops and into contact with the stops such that the resilient link is deformed to positively locate the mounting member against the respective stops.

4. The arrangement of claim 3, wherein the resilient link comprises two spring members, one spring member being deformed when the mounting member contacts the first stop and the other spring member being deformed when the mounting member contacts the second stop.

5. The arrangement of claim 3, wherein the mounting member is a magnification change carriage for an optical telescope, and is operable for moving a lens from one magnification to the other, as defined by the first and second stops.

6. An optical telescope including the arrangement of claim 5.

7. The arrangement of claims 3, wherein the drive means is a rotating drive and includes a coupling portion spaced from the axis of rotation of the drive engaging a coupling portion provided on the mounting member, whereby rotation of the drive means produces linear movement of the mounting member along the track.

8. The arrangement of claim 7, wherein the drive means is operable to rotate the coupling portion approximately 180 degrees to move the mounting member between the stops.

9. The arrangement of claim 8, wherein the drive means is a limited angle torque motor.

10. The arrangement of claim 7, wherein the drive means coupling portion is a pin and the mounting member coupling portion is a sprung fork.

11. A lens mounting arrangement for permitting movement of a lens to an accurately defined first position, the arrangement comprising:

a track including a first stop at a first end of the track;

a lens carriage moveable along the track;

drive means coupled to the carriage for moving the carriage along the track and into contact with the stop, the stop defining said first position; and a coupling provided between the drive means and the carriage including a resilient link.

12. A lens mounting arrangement comprising:

a track including first and second stops at respective first and second ends of the track;

a lens carriage moveable along the track;

drive means coupled to the carriage for moving the carriage along the track between the stops; and a coupling provided between the drive means and the carriage including a resilient link, wherein the drive means is operable to move the lens carriage between the stops and into contact with the stops such that the resilient link is deformed to positively locate the lens carriage against the respective stops.

* * * * *